United States Patent [19]
Marsland et al.

[11] 3,746,490
[45] July 17, 1973

[54] PASTE COMPOSITIONS FOR CONTROLLING FIRST INSTAR BOT LARVAE AND ENDOPARASITES IN HORSES

[75] Inventors: William P. Marsland, Turlock, Calif.; Marvin L. Sharp, Vernon, Tex.

[73] Assignee: Shell Oil Company, Houston, Tex.

[22] Filed: Dec. 23, 1971

[21] Appl. No.: 211,709

[52] U.S. Cl. ............................................... 424/219
[51] Int. Cl. ............................................. A61k 27/00
[58] Field of Search .................................... 424/219

[56] References Cited
UNITED STATES PATENTS 3,398,225   8/1968   Bellin ........................... 424/219
3,630,896   12/1971  Oka et al. ...................... 424/219

OTHER PUBLICATIONS

Prinz–Dental Formulary (1923) Lea & Febiger, N.Y., p. 166.

Gorgas–Dental Medicine (1884) Churchill Co., London, p. 88.

*Primary Examiner*—Sam Rosen
*Attorney*—Frank R. La Fontaine et al.

[57] ABSTRACT

A method for controlling first instar bot larvae and endoparasites in horses which comprises applying into the mouth of the horse a paste composition containing dimethyl dichlorovinyl phosphate which adheres to the mouth and hard palate of the horse.

4 Claims, No Drawings

PASTE COMPOSITIONS FOR CONTROLLING FIRST INSTAR BOT LARVAE AND ENDOPARASITES IN HORSES

Field of the Invention

This invention relates to a method for controlling endoparasites in horses.

Description of the Prior Art

Horses are subject to attack by a number of different endoparasites —that is, internal parasites— including helminths and insect larvae. These internal parasites account for a run-down appearance, lethargy, rough coat, digestive disturbances and even death in badly infected horses. A variety of different compounds, including organophosphates, have been used in attempting to control these internal parasites.

The anthelmintic use of dimethyl 2,2-dichlorovinyl phosphate, known in the art as DDVP and hereinafter in this specification referred to for brevity as DDVP, in polyvinyl chloride resin solution, is disclosed in U.S. Pat. No. 3,166,472.

Two types of internal parasites that are particularly harmful to horses are the common horse botfly, *Gastrophilus intestinalis*, and the chin fly or throat bot, *Gastrophilus nasalis*. The life cycle of the common horse bot begins with the laying of the eggs by the adult fly on the hair of the horse. When the lips or tongue of the horse touch the eggs, the eggs quickly hatch and cling to the lips or tongue. After entering the mouth, the first instar larvae burrow into the tongue where they stay for 24 to 28 days. The larvae then leave the tongue, molting to the second instar and migrating to the stomach where they remain for five weeks. At this time, the molt to the third instar occurs and this instar spends nine to ten months in the stomach. Similarly, the throat bot lays its eggs on the hair around the horse's mouth and throat. When the eggs hatch, they crawl into the horse's mouth and buttow into the cheeks and tongue, spending 21 to 30 days there before molting to the second instar and migrating to the stomach or duodenum. They also tend to attach to the pharynx, paralyzing the muscles that control swallowing. The rest of the life cycle of the throat bot is similar to that of the common horse bot. The mature larvae, which are about one-half to three-fourths inches long, are excreted in the feces, whereupon they burrow into the ground, form a pupa, and emerge as adults in three to ten weeks.

During the larval stage, the bot linves on the horse's tissue. The larvae cause damage to the tongue, lips, and lining of the stomach and intestines. Lesions appear in the stomach and intestines where the bots attack, causing an inflamed and ulcerous condition. The bots also absorb food, secrete toxic substances, and obstruct the passage of food in the stomach and intestines.

A drawback associated with the prior art compositions used for treating internal parasites is the failure to affect the first instar bot larvae so that the horse must endure the bot infection and the concurrent side effects thereof such as lesions in the tongue, lips, and cheeks, and the discomfort of the larvae incubating in the mouth, until the second instar stage occurs and the bots reach the stomach or intestines. This failure occurs because the endoparasiticides as commonly administered are active only in the stomach and intestines. The typical means of administration, for example, by drench, stomach tube, tablet, or top dressing of feed, are all designated to get the anthelmintic as quickly as possible to the stomach, bypassing the first instar larvae in the mouth.

In addition, these known ways of administering endoparasiticides to horses are either dangerous or ineffective. When the endoparasiticide is administered by drench, it is difficult to achieve accurate dosing and there is a high probability of getting the material into the lungs. A stomach tube requires the effort of three men, presents a great possibility of injury to the horse and/or the men, and also has a great probability of getting the material into the lungs. When administering the endoparasiticide by means of a tablet, the tablet must be inserted far back into the mouth or the horse will spit it out. If it is inserted too far in the mouth, it will injure the pharnx. The tablet may also lodge in the esophagus and cause choking and death. Administering the endoparasiticide as a top dressing for feed presents two problems. There is no control over the amount of the dose and the animals refuse to eat the feed.

Summary of the Invention

It has now been found that safe and accurate administration of DDVP that is effective in controlling internal parasites, including first instar bots, is obtained when the DDVP is administered in the form of a paste formulation. The term "paste" is used herein to denote a soft, semisolid material that flows slowly at room temperature and does not retain its shape and includes both substances that exist naturally in a paste form and those that are liquids thickened to a paste. The paste formulation, which is tacky and adheres to the horse's teeth and hard palate making it impossible for the horse to spit it out, is administered by introducing a parasitcidally effective amount of the paste into the horse's mouth. Once in the mouth the paste is slowly dispersed by melting and/or by the mechanical moving of the paste by the horse. The DDVP present in the mouth causes the first instar larvae to come to the surface of the tongue and surrounding tissue and to die. An additional advantage of the paste is that the DDVP reaches the stomach over a period of time rather than as one large dose.

Description of the Preferred Embodiments

The paste formulations of this invention comprise DDVP in an inert carrier. The preparation of DDVP has been disclosed in U.S. Pat. No. 2,956,673. The inert carrier may be a substance that occurs natually as a paste or an oil thickened to the appropriate consistency. Broadly, the paste formulations fall into two categories, those containing natural pastes and those containing pastes formed from thickened oil. Any nontoxic substance that is a natural paste, melting near the normal body temperature of a horse, i.e., from 99°C to 101°C, is contemplated for use within the scope of this invention. A suitable natural paste is petrolatum. When this paste injected into the horse'mouth the paste melts and slowly moves down the horse's throat. Also contemplated within the scope of the invention are oils that can be thickened to a paste-like consistency. Oils suitable for thickening include corn oil, safflower oil, peanut oil, sesame oil, almond oil, cottonseed oil, olive oil and mineral oil or mixtures thereof.

The oils are thickened with 4 to 10 percent of the conventional, non-toxic thickeners of the pharmaceutical art such as colloidal silica. When colloidal silica is used as a thickener, the thickened oil forms a paste that is actually a thixotropic gel. When this paste is injected into the horse's mouth, the mechanical moving of the paste by the horse disrupts the gel structure and the horse slowly works the formulation down its throat.

In some cases, it may be desirable to use a formulation based on a natural paste while in other cases a formulation based on thickened oil may be preferable.

Preferably the paste has hydrophobic, that is, water-repellant, properties so that it will remain in the horse's mouth long enough to be effective against the first instar bots rather than immediately being dissolved by the moisture present in the mouth.

From 0.1 to 5.0 percent of the paste may be a conventional emulsifier, such as Tween 80, to prevent phase separation.

The palatability of the paste is improved by the addition of any conventional, non-toxic such as butylated hydroxy toluene, propyl gallote, ethoxyquin, vitamin E, sterols, or combinations of citric acid with propyl gallate or butylated hydro toluene. A sweetening agent, such as sugar molasses, calcium cyclamate, sodium cyclamate, or sodium saccarin, may also be included to improve the palatability.

The DDVP may be formulated directly by mixing with the paste or it may be formulated in solution in small polyvinyl chloride pellets, said pellets being present in the paste. If the DDVP is formulated directly in the paste, the rate of release of the DDVP is rapid. If the DDVP is present in polyvinyl chloride solution, it is released more slowly over a longer period of time. The preparation of the pellets of DDVP in polyvinyl chloride and the use of these pellets as anthelmintics is disclosed in U.S. Pat. Nos. 3,166,472 and 3,318,769. The slower, controlled release of DDVP provides for continued activity in the horse's intestines as well as the mouth and stomach. The pellet size is kept small so that the horse does not choke as the pellets are swallowed, and the small size allows application by conventional type syringes. The amount of DDVP in the paste is limited by the solubility of DDVP in the particular paste or oil chosen. As a practical matter, the amount of DDVP in a given amount of paste is selected so that the quantity of paste administered to horse is neither so large as to exceed the capacity of the horse's mouth nor so small as to be difficult to measure. Preferably, the ratio of DDVP to paste carrier will be in the range of 1:50 to 2:1. Also contemplated within the scope of the invention is a paste containing DDVP in both the paste itself and in polyvinyl chloride pellets present in the paste, thereby providing an initial rapid release of DDVP in the mouth and stomach combined with a slower, sustained release of DDVP in the intestines.

The DDVP pastes can be used to eradicate parasites already present, and/or they can be used prophylactically — in other words, they can be used to cure already present parasitic infestation and can be used to prevent infestation.

The dosage of DDVP used will depend upon the particular kind or kinds of parasites to be controlled, the particular endoparasitic paste used, whether the paste is to be used to cure an already existing infection, or merely as a prophylactic, and the like. In general however, larger dosages are required to cure an already existing infestation than are required for prophylaxis. Prophylactic dosages ordinarily will amount to about 2–10 milligrams DDVP per kilogram of the horse's body weight. The dosage required to eradicate already existing endoparasites ordinarily will be at least 5 milligrams of DDVP per kilogram of the horse's body weight, with usual dosages being about 20 to 50 milligrams on the samd basis. The maximum dosage is determined by the toxicity of the DDVP to the horse. The paste formulation of this invention provides an excellent safety factor in that it reduces the dermal toxicity of the DDVP and it controls the rate of release of the DDVP in the horse so dosage is gradually made available to act against the parasites.

In contrast to the prior art methods of administering endoparasiticides in horses, the DDVP paste is quickly and safely administered with a minimum of side effects by introducing the paste into the horse's mouth by means of a syringe or hyprodermic applicator. The applicator, which may be glass, plastic, or metal is inserted in the horse's mouth and the appropriate amount of paste to yield the desired dosage is injected. The paste then adheres to the horse's teeth and hard palate, making it impossible for the horse to spit it out. The horse then gradually swallows the endoparasitic mixture.

The DDVP paste of this invention may be administered in conjunction with other conventional methods used for helminth control. For example, routine administration of known anthelmintics, such as piperazine or phenothiazine derivatives, may be continued without adversely affecting the effectiveness of the DDVP paste formulation.

The DDVP paste formulation is effective against the first instar bot larvae found in the mouth, and against the parasites found in the stomach and upper small intestine. When the small pellets of DDVP in polyvinyl chloride solution are added, the paste is also effective against parasites in the lower intestines.

The DDVP pastes of this invention are effective against a wide spectrum of endoparasitic organisms and are particularly effective against species of Gastrophilus, Habronoma, Parascaris, Oxyuris and Strongylus to name but a few. Of particular interest is the use of the DDVP paste to control the first instar Gastrophilus in the mouth, thereby minimizing the damage done by this parasite.

The methods of formulating the DDVP pastes and the efficacy of the DDVP paste for controlling internal parasites in horses are demonstrated by the following examples. The results are presented to show the use of the method and are not to be construed as limiting the scope of the invention.

EXAMPLE I

A dry powder containing 60 percent DDVP was prepared by mixing polyvinyl chloride resin with DDVP until a dry, free-flowing powder was obtained. 900 Grams of the powder and 600 grams petrolatum were combined in Hobart mixer and mixed for 13 minutes. The resultant paste contained 350 milligrams of DDVP per milliliter of the and had the following percent by weight composition:

DDVP     33.0
Polyvinyl chloride     27.0
Petrolatum     40.0

EXAMPLE II

A DDVP paste based on sesame oil was prepared by premixing 140.0 grams DDVP, 232.0 grams sesame oil, and 4.0 grams Tween 80 (a polyxyethylene derivative of fatty acid partial esters of hexital anhydrides) in an 800 milliliter beaker. Cab-O-Sil M-5 (anhydrous and particulate colloidal silica) was added in four portions of 6 grams each. The mixture was stirred for 10 minutes after each addition. The resultant paste had the following percent by weight composition:

DDVP 35.0
Sesame Oil 58.0
Tween 80 1.0
Cab-O-Sil M-5 6.0

Using a similar procedure, compositions having the following percent by weight composition were prepared:

|  | A | B |
|---|---|---|
| DDVP | 21.0 | 21.0 |
| Corn Oil | 72.0 | — |
| Cottonseed Oil | — | 72.0 |
| Tween 80 | 1.0 | 1.0 |
| Cab-O-Sil M-5 | 6.0 | 6.0 |

EXAMPLE III

A paste formulation containing DDVP in the paste as well as in pellets suspended in the paste was prepared by mixing 140.07 grams DDVP, 476.90 grams sesame oil, and 6.67 grams Tween 80 in a Hobart mixer for 5 minutes. After the liquid ingredients were blended, 40.02 grams CCab-O-Sil M-5 and 3.34 grams calcum cyclamate were added in four portions while stirring the mixture. To this mixture was added with thorough mixing 330.0 grams of polyvinyl chloride pellets, 0.05 inches by 0.05 inches in size and containing 20 percent DDVP and 18 percent dioctyl phthalate.

The paste prepared in this manner supplied DDVP to the intestines and cecum as a result of the slow release of DDVP from the pellets as well as the DDVP supplied to the mouth and stomach from the DDVP found in the sesame oil.

Using a similar procedure, paste formulations were prepared having the following percent by weight compositions:

|  | C | D |
|---|---|---|
| DDVP | 6.87 | 2.75 |
| Kaydol (mineral oil) | 37.33 | 59.92 |
| Cottonseed oil | 18.67 | — |
| Cab-O-Sil M-5 | 3.80 | 4.00 |
| Polyvinyl chloride pellets containing 20 percent DDVP | 33.33 | 33.33 |

EXAMPLE IV

To 25 grams of the sesame oil paste of Example II was added with thorough mixing 65 grams vaseline and 45 grams of polyvinyl chloride pellets, 0.05 inches by 0.05 inches in size and containing 20 percent DDVP and 12 percent dioctyl phthalate. The resultant paste was administered to three horses at a dosage rate of 30 milligrams DDVP per kilogram of body weight. The paste was administered by a syringe which extruded the formulation onto the horses tongue. Seven days after the administration of the paste the horses were euthanized, each animal eviscerated, the entire gastro-intestinal tract examined for the presence of parasites material. All feces passed by each animal were collected at 24 hour intervals with all parasitic material being identified, counted and recorded. The results are presented in Table I.

TABLE I

| Horse No. | Parasite | Passed/Total | Reduction % |
|---|---|---|---|
| 1 | Gastrophilus intestinalis | | |
|  | 2nd Instar | 96/96 | 100 |
|  | 3rd Instar | 352/352 | 100 |
|  | Gastrophilus nasalis | | |
|  | 3rd Instar | 80/80 | 100 |
|  | P. equorum | 5/5 | 100 |
|  | Large Strongyles | | |
|  | S. Edentatus | 64/78 | 82 |
|  | S. Vulgaris | 224/224 | 100 |
|  | Small Strongyles | 88320/88320 | 100 |
|  | Pinworms | | |
|  | O. Equi | 4144/4144 | 100 |
| 2 | Gastrophilus intestinalis | | |
|  | 3rd Instar | 350/385 | 90.9 |
|  | Gastrophilus nasalis | | |
|  | 3rd Instar | 128/128 | 100 |
|  | Large Strongyles | | |
|  | S. Edentatus | 112/114 | 98.2 |
|  | S. Vulgaris | 16/16 | 100 |
|  | Small Strongyles | 6912/6912 | 100 |
|  | Pinworms | | |
|  | O. Equi | 576/576 | 100 |
| 3 | Gastrophilus intestinalis | | |
|  | 2nd Instar | 64/64 | 100 |
|  | 3rd Instar | 397/401 | 99.0 |
|  | Gastrophilus nasalis | 43/43 | 100 |
|  | Large strongyles | | |
|  | S. Edentatus | 224/261 | 85.8 |
|  | S. Vulgaris | 416/416 | 100 |
|  | Small Strongyles | 20,064/20,320 | 98.7 |

EXAMPLE V

The cottonseed oil-based 35 percent DDVP paste formulation prepared according to the method of Example II was administered to 28 horses at a dosage rate ranging from 1.25 to 40 milligrams DDVP per kilogram of body weight. The paste was administered by means of a syringe inserted in the hors's mouth directing the paste toward the back of the tongue and the roof of the mouth. About 96 hours after the administration of the paste the horses were euthanized, each animal eviscrated, and the entire gastro-intestinal tract from the stomach to the rectum inspected for the presence of bots, ascarids, and pinworm. All feces passed by each animal were collected at 24 hour intervals with all parasitic material being identified, counted and recorded. The results are presented in Table II.

TABLE II.—REDUCTION OF PARASITIC INFESTATION BY ADMINISTERING DDVP PASTE

| Dose (mg./kg.) | Gastrophilus intestinalis | | Gastrophilus nasalis | | Ascarids | | Mature pinworms | |
|---|---|---|---|---|---|---|---|---|
|  | Passed/total | Reduction (percent) | Passed/total | Reduction (percent) | Passed/total | Reduction (percent) | Passed/total | Reduction (percent) |
| 1.25 | 0/0 | | 0/0 | | 3/3 | 100 | 0/0 | |
| 1.25 | 4/25 | 16 | 0/0 | | 85/276 | 31 | 0/80 | 0 |
| 2.5 | 34/157 | 22 | 0/0 | | 14/16 | 88 | 0/0 | |
| 2.5 | 90/114 | 79 | 1/4 | 25 | 0/0 | | 0/0 | |
| 2.5 | 46/92 | 50 | 0/0 | | 3/3 | 100 | 0/18 | 0 |
| 2.5 | 0/0 | | 13/40 | 33 | 4/4 | 100 | 0/0 | |
| 2.5 | 40/55 | 73 | 0/8 | 0 | 13/13 | 100 | 0/0 | |
| 5.0 | 28/32 | 88 | 5/23 | 22 | 9/14 | 64 | 0/0 | |
| 5.0 | 20/23 | 87 | 0/0 | | 33/48 | 69 | 0/0 | |
| 5.0 | 58/58 | 100 | 1/1 | 100 | 20/20 | 100 | 0/0 | |
| 5.0 | 5/7 | 71 | 2/2 | 100 | 6/6 | 100 | 0/0 | |
| 5.0 | 0/0 | | 1/1 | 100 | 31/31 | 100 | 0/0 | |

TABLE II.—REDUCTION OF PARASITIC INFESTATION BY ADMINISTERING DDVP PASTE

| Dose (mg./kg.) | Gastrophilus intestinalis Passed/total | Reduction (percent) | Gastrophilus nasalis Passed/total | Reduction (percent) | Ascarids Passed/total | Reduction (percent) | Mature pinworms Passed/total | Reduction (percent) |
|---|---|---|---|---|---|---|---|---|
| 10 | 343/343 | 100 | 0/0 | | 10/10 | 100 | 0/0 | |
| 10 | 150/174 | 86 | 1/1 | 100 | 0/0 | | 0/0 | |
| 10 | 80/86 | 93 | 3/3 | 100 | 0/0 | | 0/0 | |
| 10 | 117/117 | 100 | 0/0 | | 4/4 | 100 | 0/0 | |
| 10 | 65/65 | 100 | 147/149 | 99 | 10/10 | 100 | 0/0 | |
| 14 | 24/61 | 39 | 0/0 | | 3/3 | 100 | 10/30 | 33 |
| 14 | 189/189 | 100 | 0/0 | | 1/1 | 100 | 0/0 | |
| 14 | 1/1 | 100 | 0/1 | 0 | 5/5 | 100 | 0/0 | |
| 14 | 44/44 | 100 | 0/0 | | 0/0 | | 0/0 | |
| 14 | 56/56 | 100 | 185/194 | 95 | 11/12 | 92 | 0/0 | |
| 20 | 76/77 | 99 | 0/0 | | 1/1 | 100 | 0/0 | |
| 20 | 128/128 | 100 | 0/0 | | 0/0 | | 0/0 | |
| 20 | 20/20 | 100 | 0/0 | | 70/70 | 100 | 0/0 | |
| 20 | 553/553 | 100 | 21/21 | 100 | 0/0 | | 0/0 | |
| 20 | 159/249 | 64 | 25/25 | 100 | 11/11 | 100 | 0/0 | |
| 20 | 117/117 | 100 | 44/44 | 100 | 0/0 | | 0/2 | 0 |
| 28 | 164/164 | 100 | 0/0 | | 19/19 | 100 | 0/0 | |
| 28 | 147/147 | 100 | 0/0 | | 0/0 | | 0/0 | |
| 28 | 90/129 | 70 | 0/0 | | 10/10 | 100 | 0/0 | |
| 28 | 495/495 | 100 | 51/51 | 100 | 0/0 | | 0/0 | |
| 28 | 42/51 | 82 | 97/97 | 100 | 0/0 | | 24/24 | 100 |
| 40 | 50/50 | 100 | 0/0 | | 4/4 | 100 | 24/24 | 100 |
| 40 | 24/213 | 11 | 0/0 | | 0/0 | | 0/0 | |
| 40 | 82/82 | 100 | 0/0 | | 51/51 | 100 | 0/0 | |
| 40 | 269/269 | 100 | 5/5 | 100 | 3/3 | 100 | 0/0 | |
| 40 | 122/122 | 100 | 111/111 | 100 | 0/0 | | 0/0 | |
| 40 | 53/53 | 100 | 2/2 | 100 | 4/4 | 100 | 0/0 | |

EXAMPLE VI

A paste formulation prepared according to Example I (hereinafter designated Paste M) and 10 percent and 35 percent DDVP formulations prepared according to Example II (hereinafter designated Paste N and Paste O) were administered to horses at 20 and 40 milligrams DDVP per kilogram of body weight. The feces of each horse were collected for 7 days and examined for parasites. Parasites found in the feces were counted identified and recorded. On the seventh day the horses were euthanized and the parasites remaining in the gastrointestinal tract counted and identified. The results appear in Table III.

TABLE III

| Formulation | Dosage, DDVP mg./kg. | G. intestinalis 1st instar Passed/total | Percent reduction | G. intestinalis 2nd instar Passed/total | Percent reduction | G. intestinalis 3rd instar Passed/total | Percent reduction |
|---|---|---|---|---|---|---|---|
| Paste N | 40 | 16/— | | 40/40 | 100 | 112/112 | 100 |
| Paste N | 40 | 16/— | | | | 208/209 | 99.5 |
| Paste O | 20 | 64/— | | 288/288 | 100 | 214/221 | 96.8 |
| Paste M | 20 | | | | | 227/227 | 100 |

| Formulation | Dosage, DDVP mg./kg. | G. nasalis 1st instar Passed/total | Percent reduction | G. nasalis 2nd instar Passed/total | Percent reduction | G. nasalis 3rd instar Passed/total | Percent reduction |
|---|---|---|---|---|---|---|---|
| Paste N | 40 | | | | | 11/11 | 100 |
| Paste N | 40 | | | | | 64/64 | 100 |
| Paste O | 20 | | | 32/32 | 100 | 96/96 | 100 |
| Paste M | 20 | 16/— | | 32/32 | 100 | 288/305 | 94.4 |

TABLE IV
ACTIVITY OF DDVP PASTE FORMULATION AT 10 MG/KG AGAINST 1ST INSTAR GASTROPHILUS INTESTINALIS

| Animal No. | Infection No. Larvae | Treatment Total ml* | No. of Larvae in Stomach 2nd Instar | 3rd Instar |
|---|---|---|---|---|
| 1 | 100 | 8.0 | 0 | 0 |
| 2 | 100 | Untreated | 28 | 0 |
| 3 | 99 | 1.4 | 0 | 0 |
| 4 | 98 | 1.4 | 0 | 0 |
| 5 | 98 | 1.6 | 0 | 0 |
| 6 | 99 | Untreated | 1 | 7 |
| 7 | 100 | Untreated | 1 | 7 |

* Contained 340 mg of DDVP per ml

EXAMPLE VII

Seven horses were artificially infected with 100 *Gastrophilus intestinalis* larvae each. On the tenth day following artificial infection, the cottonseed oil-based 35 percent DDVP paste prepared according to the method of Example II was administered to four of the horses by hypodermic syringe at a dosage rate of 10 milligrams per kilogram. After a period of time sufficient for the larvae to reach the second or third instar, the horses were euthanized and the gastric mucosae examined for infestation. The results were summarized in Table IV BELOW.

EXAMPLE VIII

The effect of the cottonseed oil-based 35 percent DDVP paste prepared according to the method of Example II on the first instar *Gastrophilus intestinalis* larvae was evaluated by artificially infecting 10 Shetland ponies with first instar larvae, treating 5 ponies with the DDVP paste, and comparing the bot migration in the two groups of ponies.

Of 2 foals receiving a total of 256 1st instars on the tongue on days 0, 7 and 14, one animal was dosed with DDVP paste at 10 mg/kg of body weight on day 21.

These 2 foals were necropsied on day 56. Each of 8 foals was challenged similarly with 500 total larvae in a second trail. Four of these foals were administered DDVP paste at 20 mg/kg on day 21, and necropsied on day 42.

There were 350 second instar bots in the digestive tracts of the 5 untreated controls, representing 15.8 percent of the original challenge with first instars. No second instar bots were found in the tracts of foals receiving dichlorovos paste at either dosage level, resulting in 100 percent efficacy against 1st instar *G. intestinalis* migrating in the tongues of pony foals.

No significant pathologic changes were observed in the tongue. Tissue reaction to larval migration was somewhat more evident in the untreated foals than in those that were treated. No remnants of first instar larvae were found in the lingual tissue indicating that the DDVP paste stimulated the larvae to leave the tongue before death.

We claim as our invention:

1. A method for controlling first instar bot larvae in horses which comprises applying into the mouth of a horse a therapeutic amount of a paste composition containing dimethyl 2,2-dichlorovinyl phosphate which adheres to the teeth and hard palate of the horse, whereby first instar bot larvae and endoparasitic worms in the horse are controlled.

2. A method according to claim 1 wherein the paste comprises a thickened oil containing dimethyl 2,2-dichlorovinyl phosphate.

3. A method according to claim 2 wherein the paste contains an emulsifier consisting of a polyoxyethylene derivative of fatty acid partial esters of hexital anhydrides.

4. A method according to claim 2 wherein the thickened oil is thickened cottonseed oil.

* * * * *